United States Patent [19]

Flaig et al.

[11] Patent Number: 4,559,914
[45] Date of Patent: Dec. 24, 1985

[54] CONTROL DEVICE FOR INACTIVATING AN INTERNAL COMBUSTION ENGINE

[75] Inventors: Ulrich Flaig, Markgröningen; Hermann Grieshaber, Stuttgart; Albrecht Sieber, Ludwigsburg; Jürgen Wietelmann, Ditzingen, all of Fed. Rep. of Germany

[73] Assignee: Robert Bosch GmbH, Stuttgart, Fed. Rep. of Germany

[21] Appl. No.: 633,096

[22] Filed: Jul. 20, 1984

[30] Foreign Application Priority Data

Jul. 28, 1983 [DE] Fed. Rep. of Germany ....... 3327157

[51] Int. Cl.⁴ ............................................ F02D 31/00
[52] U.S. Cl. ............................ 123/359; 123/198 DB; 73/119 A
[58] Field of Search ........ 123/359, 357, 358, 198 DB, 123/198 D; 73/119 A

[56] References Cited

U.S. PATENT DOCUMENTS

| | | | |
|---|---|---|---|
| 3,661,130 | 5/1972 | Eheim | 123/359 |
| 3,919,885 | 11/1975 | Kaireit | 73/119 A |
| 4,403,580 | 9/1983 | Bader | 123/198 DB |
| 4,407,245 | 10/1983 | Eheim | 123/359 |

*Primary Examiner*—Magdalen Y. C. Moy
*Attorney, Agent, or Firm*—Michael J. Striker

[57] ABSTRACT

A control device for protecting an internal combustion engine in the case of malfunction of its fuel regulating system is disclosed. The control device includes means which in response to the occurrence of the first braking mode of operation of the engine after start activates a suction or pump connected to the suction chamber of a fuel injection pump. Then the reaction of the engine to the suction pump is tested. If, the engine does not react to a displacement of the control rod of the fuel adjusting mechanism, then an error is present and the engine is either stopped or switched over to an emergency mode of operation. The control device is suitable particularly for a Diesel engine.

12 Claims, 2 Drawing Figures

CONTROL DEVICE FOR INACTIVATING AN INTERNAL COMBUSTION ENGINE

BACKGROUND OF THE INVENTION

The present invention relates in general to an internal combustion engine system of the type having a fuel supply tank, fuel injection means operating preferably with Diesel fuel and including a fuel injection pump provided with a suction chamber, means for adjusting the amount of injected fuel, a fuel supply pump normally connected via a supply conduit between the fuel supply tank and the suction chamber of the fuel injection pump. In particular, this invention relates to a control device for inactivating the internal combustion engine of the system, the control device including a suction device connection to the suction space of fuel injection pump to empty the suction space in response to any malfunction of the fuel injection means, and means for verifying the operativeness of the suction device.

A control device of this kind is known from the German publication DE-OS R. 18,356, assigned to the same assignee.

Diesel engines are equipped usually with a mechanically driven fuel injection pump. The amount of injected fuel and thus the engine performance is determined by an adjusting mechanism. This adjusting mechanism is actuated either hydraulically or electromagnetically and includes fuel quantity regulating elements, such as a control rod of a series-connected pump whose position determines the amount of injected fuel. During the operation of the engine it may happen, however that the control rod is stuck, for example, due to the penetration of a foreign particle. The operator of the internal combustion engine system, for example a driver of a motor vehicle in which the engine is installed, has no longer any control of the operational behavior of the vehicle. In the event when the regulating or control rod is stuck in a position corresponding to a high dosing of the fuel, the rotary speed of the engine rises to an unacceptable level, the engine is also supplied with an excessive amount of fuel. Under these condition the risk of accidents is substantially increased.

In order to facilitate fast emergency disconnection of the internal combustion engine, particularly in a vehicle operating with Diesel fuel, it has been devised that in the case of a clamped regulating rod the fuel supply be interrupted as fast as possible and in addition, the suction chamber of the fuel injection pump be emptied. The beforementioned prior art suction device employs for this purpose an additional suction device and an electromagnetically controlled stop valve. The disadvantage of this known solution is the fact that the operativeness of the prior art control device for inactivating the internal combustion engine cannot be supervised without further measure, particularly it cannot be verified by the user of the motor vehicle.

SUMMARY OF THE INVENTION

It is, therefore, an object of the present invention to overcome the aforementioned disadvantage.

More particularly, it is an object of the invention to provide an improved control device of the aforedescribed kind which enables, at least during each start of the engine, an automatic testing of the suction off device for the injection pump.

Another object of this invention is to disconnect immediately the engine when the suction off device is found to be out of order.

An additional object of the invention is to provide such a control device which is simple in structure and permits a continuous supervision of the emergency stopping system of the engine.

Furthermore, an object of this invention is to provide such an improved control device which can be realized by the software of a computer without necessitating additional hardware component parts.

In keeping with these objects and others which will become apparent hereafter, one feature of the invention resides, in a control device for protecting an internal combustion engine in a fuel combustion system of the aforedescribed kind, in the provision of checking means for verifying the operativeness of the suction device connected to the suction chamber of the fuel injection pump, the checking means comprising means for activating the suction device when the engine is in a braking mode of operation, means for evaluating the reaction of the internal combustion engine to the activation of the suction device and means for turning off the engine when an irregular operation of the suction device is detected.

According to another feature of this invention instead of turning off the engine, the latter can be switched over to an emergency operation. Preferably, there is also provided an alarm device controlled by the checking means to give a warning signal to the operator of the machine.

If the internal combustion engine is provided with a hydraulic setting mechanism, a short actuation of the suction device makes it possible to determine whether the regulating or control rod of the mechanism moves correctly. If the internal combustion engine is provided with an electromagnetic setting mechanism, a full charge of the fuel is momentarily injected in the engine and the reaction of the machine such as the change in the rotary speed, is determined. The user of the fuel combusting power system cannot take notice of this momentary testing process which in practice does not disturb the normal operation of the engine. Only then when an interference in the control device causes the stoppage of the engine and the latter is turned off or switched over to an emergency operation or when the alarm device is released, the operator is aware of the contingency. The substantial advantage of this stopping device is the fact that the user of the machine becomes aware of a malfunction at a time point at which in general no danger is involved and at which the repair of the engine is still relatively easy without further consequences.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

In a known internal combustion engine system of the aforedescribed kind, a fuel delivery pump sucks the fuel via a suction conduit from a fuel supply tank. The fuel is fed via a supply conduit and a control valve in the suction chamber of the fuel injection pump which forces the fuel through the injection nozzles. Excessive fuel which has not been discharged through the injection nozzles is returned from the suction space of the injection pump via an overflow conduit into the fuel supply tank. In the case of a malfunction, such as seized control rod of the fuel adjusting mechanism it is desired to stop the engine. For this purpose an electrically driven fuel pump is actuated and simultaneously a control valve disconnects the fuel supply. The control closes the supply conduit leading to the suction chamber of the fuel injection pump. The fuel pump is connected to the suction chamber of the injection pump and when energized it sucks off all fuel present in the suction chamber.

Figure 1:
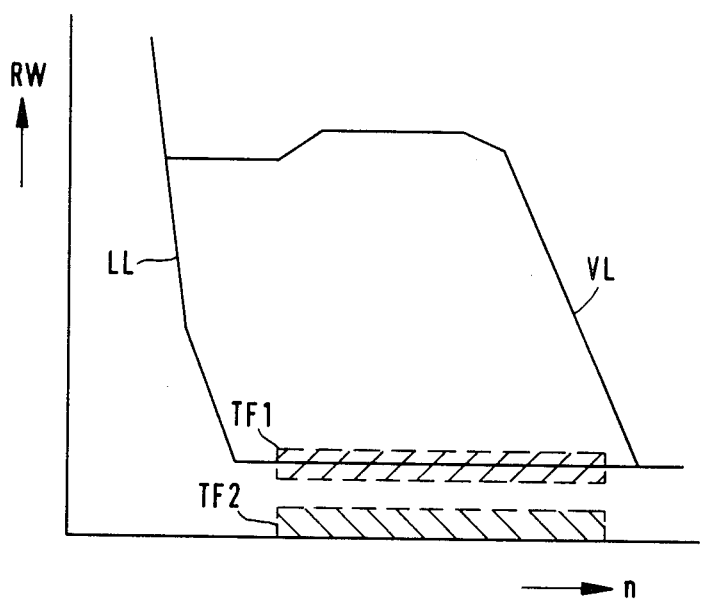
FIG. 1 shows a field of characteristics of a Diesel engine.

FIG. 1 illustrates the regulation field of characteristic lines of a Diesel engine. Rotary speed n of the engine is plotted on the abscissa, and the control rod travel RW of the setting mechanism is plotted on the ordinate. Characteristic line VL denotes the course of travel of the control rod at the full load of the engine, whereas the characteristic line LL denotes the course of the control rod travel during idling or no load operation of the engine. In the range of the horizontal course of the curve LL, a first testing window TF1 is indicated by dashed lines. Under the first test window TF1 a second test window IF2 is indicated by dashed lines in proximity to the zero value of the control rod travel RW.

Figure 2:
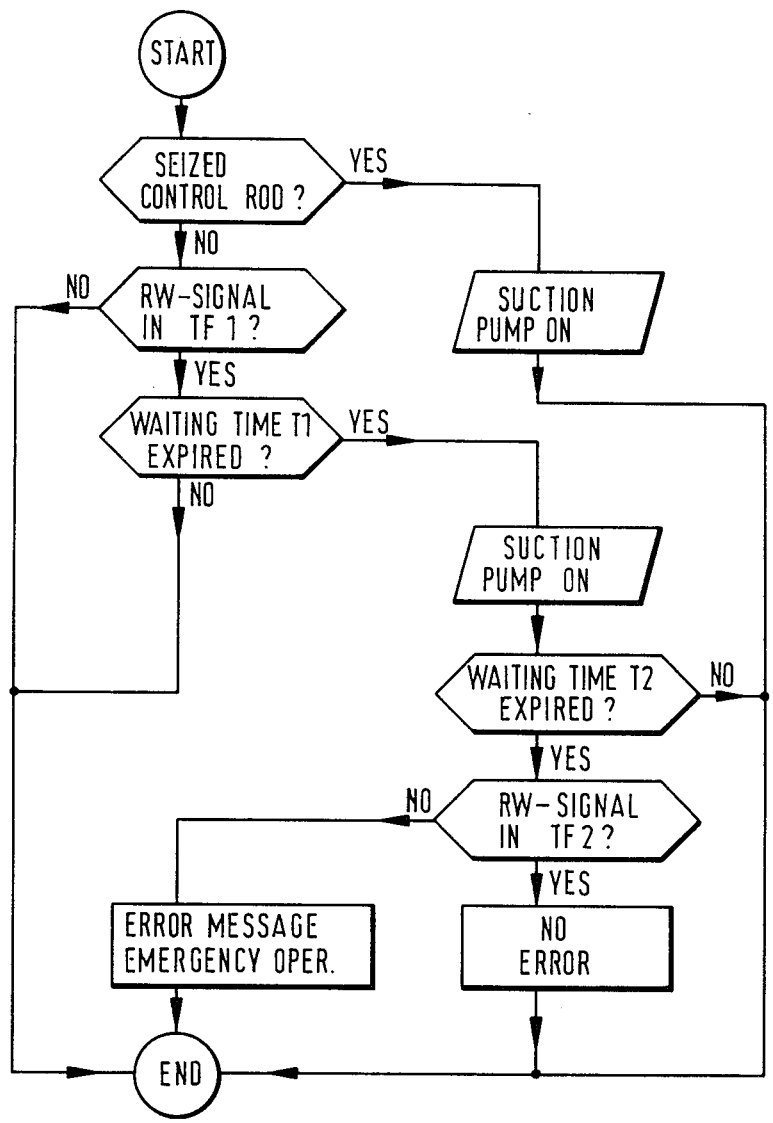
FIG. 2 is a flow chart of the control process of the device of this invention.

Preferably, the control device of this invention is realized by the software of a computer. FIG. 2 shows a flow chart of a program which controls the internal combustion engine system in accordance with this invention.

In a first embodiment of the control device for protecting the internal combustion engine, the fuel injection pump is provided with a hydraulic setting mechanism. When the engine is overrun or brought in a braking mode of operation, the control rod of the setting mechanism at normal operation of the latter has to return to its starting position and the control rod travel signal RW drops to low values corresponding to the horizontal fraction of the curve LL in FIG. 1. Accordingly, the control rod travel signal RW has reached the region of the first test window TF1.

According to this invention, as soon as the engine after its start is for the first time brought in its braking mode of operation, the electrically driven suction device in the form of fuel pump is activated. Since no hydraulic power is applied to the control rod the latter is brought to its starting or zero position. As a consequence, the control rod travel signal RW drops from the range of the first testing window TF1 in the range of the second testing window TF2. This transfer of the signal RW of course occurs only in the case when the control rod is unobstructed and free to move. If the control rod travel signal RW fails to occur in the second test window TF2 after the actuation of the electric suction device, this is an indication of an error.

The control of the fuel injection system then follows immediately after the completion of a program for an emergency operation of the engine, for example, and a warning signal is generated to alert the user of the machine.

In a second embodiment of this invention the fuel injection pump of the engine operates in connection with an electromagnetic setting mechanism. In contrast to the injection system operating with a hydraulically driven setting mechanism, there is now feedback to the control rod travel during the actuation of the suction off device. The verification of the electrically driven suction pump therefore must be made differently. As soon as the internal combustion engine after its start is brought for the first time in the braking mode of operation, then in the same manner as described above, the electric suction pump is activated. After the expiration of a waiting time the control rod is brought in full load position in accordance with full load characteristic line VL in FIG. 1. During this waiting time the electric suction pump remains activated. When the control rod is in its full load position, fuel present in the suction chamber of the fuel injection pump is sucked off and the rotary speed n of the engine is not changed. Therefore, the control device is in order. If, however, the engine increases its rotary speed n when during the test the control rod is brought in its full load position, then this increase is an indication that the electric suction pump does not operate properly. As discussed before, during the occurrence of an error, the engine is either stopped or switched over to an emergency mode of operation.

From the flow chart of FIG. 2 it is evident how the testing or verifying program is accomplished by means of the control electronics for the fuel injection pump. When the control rod is seized, the suction pump is activated and the engine is stopped, for example. If the control rod operates normally and the engine is brought into its braking mode of operation, then it is determined during the latter mode of operation whether the control rod travel signal RW is present in the first test window TF1. If it is present, then after the expiration of a first waiting time T1 the electrically driven suction pump is activated. After the expiration of a second waiting time T2, a test is made whether the control rod signal RW has reached the second test window TE2. In affirmative case, there is no error in the operation of the control device and the latter is in order. If, however, the control rod travel signal RW is not present in the second test window TF2, then the engine is stopped or switched over to an emergency mode of operation and an error message is transmitted.

It will be understood that each of the elements described above, or two or more together, may also find a useful application in other types of constructions differing from the types described above.

While the invention has been illustrated and described as embodied in specific examples of control devices for fuel injection pumps, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A control device for stopping an internal combustion engine, particularly a Diesel engine, of type including a fuel supply tank, fuel injection means including a fuel injection pump provided with a suction chamber, a mechanism including a control rod for adjusting the amount of injected fuel, a fuel supply pump connected via a supply conduit between the fuel supply tank and the suction chamber of the fuel injection pump, and a suction device connected to the suction chamber to discharge fuel from the latter when activated in response to a malfunction of the fuel injection means, comprising checking means for testing the operation of the suction device, the checking means including means for activating the suction device when the engine is brought in an braking mode of operation, means for evaluating the reaction of the engine to the activation of the suction device, and means for stopping the engine when an error in the operation of the suction device is present.

2. A control device as defined in claim 1, further comprising means for switching over the engine into an emergency mode of operation when an error in the operation of the suction device is present.

3. A control device as defined in claim 1, further comprising means for generating an alarm signal when an error in the operation of the suction device is present.

4. A control device as defined in claim 1, wherein said means for activating the suction device are responsive only to the first occurrence of the braking mode of operation of the engine after start.

5. A control device as defined in claim 1, wherein said means for activating the suction device are operative only after the expiration of a first waiting time T1.

6. A control device as defined in claim 1, wherein said means for evaluating the reaction of the engine and the means for turning off the engine are operative only after the expiration of a second waiting time T2.

7. A control device as defined in claim 1, comprising a hydraulic mechanism for adjusting the amount of injected fuel, and the means for evaluating the reaction of the engine senses the position of the control rod of the hydraulic adjusting mechanism after the occurrence of the braking mode of operation of the engine.

8. A control device as defined in claim 7, wherein in order to sense the position of the control rod the evaluating means establishes the relationship between the rotary speed of the engine and the control rod travel, the characteristic curve of this relationship defining a first test window corresponding to an unchanged region of the rotary speed for control rod travel at idling, and a second test window situated below the first test window, the evaluating means being operative for testing after the beginning of the actuation of the suction device whether the control of the hydraulic adjusting mechanism is returned in the lower second test window, and in the event when the control rod does not reach the lower second test window, the evaluation means actuate the stopping means.

9. A method of stopping an internal combustion engine having an electromagnetic mechanism for adjusting the amount of injected fuel including a control rod, and a fuel injection pump having a suction chamber, comprising the steps of discharging the suction chamber when the engine is brought in a braking mode of operation, then after a waiting time T2 placing the control rod of the magnetic adjusting mechanism into a full load position, then after the expiration of another waiting time, testing the rotary speed of the engine and in the case of an increase of the rotary speed stopping the engine.

10. A control device unloading an internal combustion engine, particularly a Diesel engine, of type including a fuel supply tank, fuel injection means including a fuel injection pump provided with a suction chamber, a mechanism including a control rod for adjusting the amount of injected fuel, a fuel supply pump connected via a supply conduit between the fuel supply tank and the suction chamber of the fuel injection pump, and a suction device connected to the suction chamber to discharge fuel from the latter when activated in response to a malfunction of the fuel injection means, comprising checking means for testing the operation of the suction device, the checking means including means for activating the suction device when the engine is brought in an braking mode of operation, means for evaluating the reaction of the engine to the activation of the suction device, and means for switching the engine in an emergency mode of operation when an error in the operation of the suction device is present.

11. A control device as defined in claim 8 wherein in the event when the control rod does not reach the lower second test window, the evaluation means actuate a warning device.

12. A method of unloading an internal combustion engine having an electromagnetic mechanism for adjusting the amount of injected fuel including a control rod, and a fuel injection pump having a suction chamber, comprising the steps of discharging the suction chamber when the engine is brought in a braking mode of operation, then after a waiting time T2 placing the control rod of the magnetic adjusting mechanism into a full load position, then after the expiration of another waiting time, testing the rotary speed of the engine and in the case of an increase of the rotary speed switching the engine in an emergency mode of operation.

* * * * *